Patented Dec. 5, 1950

2,532,348

UNITED STATES PATENT OFFICE 2,532,348

BLOOD CLOTTING PREPARATION

Albert Szent-Gyorgyi, Woods Hole, Mass., and Kálmán Laki and Mihály Gerendás, Budapest, Hungary.

No Drawing. Application November 29, 1947, Serial No. 788,966. In Hungary December 12, 1946

3 Claims. (Cl. 167—65)

This invention relates to new and improved blood-clotting preparations and to a process for preparing the same. It has particular relation to thrombin-containing compositions of increased blood-clotting effect and to a process for preparing such compositions.

The main object of the present invention is to provide a thrombin solution which has a substantially increased blood-clotting effect.

Another object of this invention is to provide a process for preparing thrombin compositions of the above mentioned type in a simple and economical manner.

Other objects and the advantages of the invention will be apparent from the following specification which describes, by way of example, some preferred embodiments of the invention.

It has been known to prepare the blood-clotting substance thrombin, which plays an important role in medical practice, by separation from animal blood. In order to obtain thrombin, animal blood is subjected to a series of precipitating, separating, dissolving and purifying steps. Upon addition to blood, the thrombin thus obtained transforms the fibrinogen present in the plasma in dissolved state, into fibrous, gel-like fibrin.

It has now been found that the blood-clotting effect of thrombin produced by any desired method, can be increased to a great extent by using the thrombin in combination with pyrocatechin. It has been further found that other organlic compounds containing one or more —OH groups are also capable of increasing the blood-clotting effect of thrombin, although the effect of these compounds on thrombin is substantially lower than that of pyrocatechin under otherwise equal conditions. As examples of the other —OH-containing organic compounds the following may be mentioned: aliphatic alcohols, such as ethyl alcohol; aromatic compounds, such as hydroquinone, resorcinol, pyrogallol, and other aromatic compounds containing an —OH group, such as thyroxine and adrenaline. Finally, it has been found that the blood-clotting effect of thrombin may also be increased by the presence of calcium salts, particularly calcium chloride. The above mentioned compounds may also be used in mixture with each other. In carrying out the invention, pyrocatechin is preferably used in an amount of 1-6 parts by weight per thousand and calcium chloride is preferably used in an amount of 2-4 parts by weight per thousand, based on the weight of the thrombin solution described in the examples.

Example 1.—0.1 g. of pulverized thrombin is dissolved in 10 cm.$^3$ of distilled water and in 5 cm.$^3$ of the solution thus obtained 0.01 g. of pyrocatechin is dissolved.

Testing of the blood-clotting effect shows that the solution, which contains pyocatechin, produces blood clotting in 20 seconds, while the other half of the solution, which is free from pyrocatechin, produces clotting in 60 seconds under equal conditions.

Example 2.—0.1 g. of pulverized thrombin is dissolved in 10 cm.$^3$ of distilled water, and in 5 cm.$^3$ of this solution $CaCl_2$ is dissolved in an amount giving a concentration of $\frac{1}{40}$ mol of $CaCl_2$ per liter. The $CaCl_2$-containing solution produces clotting in 30 seconds, while the other half of the solution, which does not contain $CaCl_2$, produces clotting in 60 seconds, under equal conditions.

In addition to the $CaCl_2$, pyrocatechin may also be added to the thrombin solution.

In order to produce thrombin, preferably fresh animal blood plasma is poured into an anti-coagulant solution, and then diluted, at least 5 times, preferably 10-15 times, with water which is free from or poor in calcium ions, such as rain or snow water. The diluted solution is precipitated by the addition of acid in such an amount that a maximum quantity of precipitate is produced. In this precipitate, the preliminary substance of the clotting material, the so-called prothrombin, is present. The precipitate is dissolved in a slightly alkaline aqueous calcium-free salt solution having a pH value of at least 7.2, i. e. in a calcium-free liquid of the Ringer solution type, and in the solution thus obtained the prothrombin is converted into thrombin by the addition of $CaCl_2$. The thrombin-containing solution is separated from the fibrin clot formed, if necessary, and finally the thrombin is precipitated from the solution, by the addition of a preciptating agent, such as acetone. After washing, the precipitate is dried. The raw thrombin thus obtained may be purified by repeatedly dissolving it in distilled water, separating the solutions from undissolved residue, acidifying the solution, mechanically removing the precipitate formed and finally reprecipitating thrombin from the solution by the addition of acetone.

For example, 50 liters of freshly obtained animal blood are protected from clotting by the addition of an aqueous sodium oxalate solution, and the blood corpuscles are removed from the solution by centrifuging. In this way, 25 liters of plasma are obtained. This plasma is precipitated by the addition of hydrochloric acid, after determining in preliminary tests the amount of acid, which produces the largest quantity of precipitate, if the liquid is diluted with distilled water to 10 times of its original volume. For example, 500 cm.³ of n/1 hydrochloric acid are used in the present case and the acidified plasma is poured into 10 times its volume of distilled water. The precipitate is separated from the solution by centrifuging and dissolved in 6.5 liters of a Ringer-solution, which, however, is free from calcium. To this prothrombin solution 225 cm.³ of a 2% $CaCl_2$ solution are added. The formation of thrombin begins in 3 minutes and reaches its maximum after 8–10 minutes. If a clot has been formed, it is crushed and the liquid contained therein is recovered by pressing. From the solution thus obtained, the thrombin is precipitated by the addition of 8 liters of acetone. The precipitate is recovered by centrifuging, mixed with 1.5 liters of dry acetone, again centrifuged and finally dried. From the dried powder the thrombin is extracted with distilled water. For example, 20 grams of dry powder are extracted first with 100, and then with 60, 40, 50 and 50 cm.³ of distilled water. The aqueous solutions containing the thrombin are decanted, and then separated from undissolved material by centrifuging. To the united thrombin solution thus obtained 1/50 part of normal acetate buffer solution having a pH of 5 are added. After mixing, the precipitate formed, which is substantially free from thrombin, is separated by centrifuging. To the separated thrombin solution a double volume of acetone is added and the mixture is allowed to stand in a cool room over night. The acetone solution is then decanted, the precipitate recovered by centrifuging, washed with dry acetone and dried. As a result of this purification, from a raw thrombin containing 2 coagulating units per mg., a purified product having 50–100 coagulating units per mg. may be obtained.

It will be apparent from the above description that the present invention is not limited to the specific substances and steps described above. For example, the amount of pyrocatechin and calcium chloride used in combination with thrombin may vary preferably within the limits stated, and mixtures other than those described above may be used as means for increasing the blood-clotting effect. The substance used for increasing the blood-clotting effect, such as calcium chloride, may be dissolved simultaneously with the thrombin, or later, for example just before the use of the solution. These and other modifications may be made, without departing from the spirit and scope of the invention as defined in the appended claims.

What is claimed is:

1. A blood-clotting composition consisting of an aqueous solution containing thrombin and catechin.

2. A blood-clotting composition consisting of an aqueous solution containing thrombin and a polyvalent phenol.

3. A blood clotting composition consisting of an aqueous solution containing about 1 part by weight of thrombin for 100 parts by weight of the solution and about 1–6 parts by weight of pyrocatechin for 1000 parts by weight of said solution.

ALBERT SZENT-GYORGYI.
KÁLMÁN LAKI.
MIHÁLY GERENDÁS.

REFERENCES CITED

The following references are of record in the file of this patent:

UNITED STATES PATENTS

| Number | Name | Date |
|---|---|---|
| 2,433,299 | Seegers | Dec. 23, 1947 |

OTHER REFERENCES

Weymouth, in Am. J. Physiol., vol. 32 (1913), pages 266–285, page 277 relied on.

Glazko, in Proc. Soc. Exptl. Biol. and Med., Apr. 1947, pages 444–446.

Seegers, in Archives of Biochemistry, Feb. 1944, pages 363–367.

Certificate of Correction

Patent No. 2,532,348 December 5, 1950

ALBERT SZENT-GYORGYI ET AL.

It is hereby certified that error appears in the printed specification of the above numbered patent requiring correction as follows:

Column 4, line 16, for "catechin" read *pyrocatechin*;

and that the said Letters Patent should be read as corrected above, so that the same may conform to the record of the case in the Patent Office.

Signed and sealed this 10th day of April, A. D. 1951.

[SEAL]

THOMAS F. MURPHY,
*Assistant Commissioner of Patents.*